Sept. 4, 1923.
B. COOPER
SNAP FASTENING
Filed Aug. 25, 1921
1,466,990
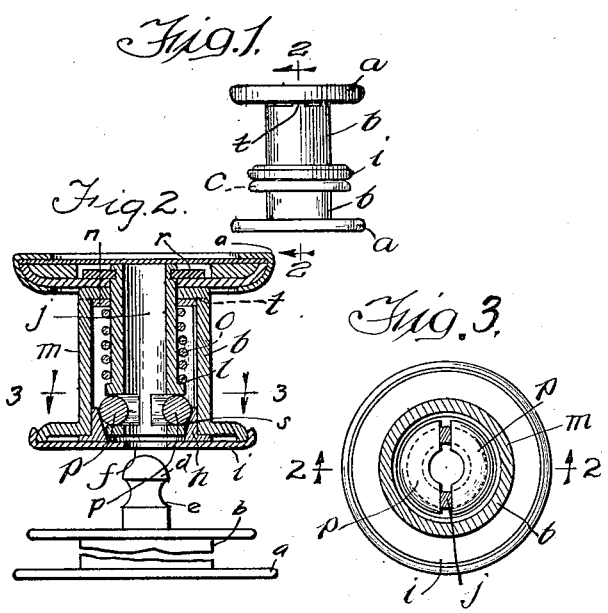
Witnesses:
W. F. Kilroy
Harry R. L. White
Barney Cooper
Inventor
By H. H. Barber Attys.

Patented Sept. 4, 1923.

1,466,990

UNITED STATES PATENT OFFICE.

BARNEY COOPER, OF CHICAGO, ILLINOIS.

SNAP FASTENING.

Application filed August 25, 1921. Serial No. 495,248.

*To all whom it may concern:*

Be it known that I, BARNEY COOPER, a citizen of Russia, residing at Chicago, county of Cook and State of Illinois, have invented a certain new and useful Improvement in Snap Fastenings, of which the following is a specification.

My invention relates to improvements in snap fastenings for separable buttons, and is especially adapted to the form of separable buttons commonly known as cuff buttons.

The principal object of my invention is to provide means for securely locking together the two separable portions of the button, and of easily releasing the same, when it is desirable to separate the two portions.

My invention also comprises certain details of form, combination and arrangement of parts, all of which will be fully set forth in the description of the accompanying drawings, in which:

Figure 1 is an elevation of a cuff button with the present invention thereto applied;

Figure 2 is a sectional view of the female portion, on line 2—2 of Figure 3; and Figure 3 is a sectional view on line 3—3 of Figure 2.

Similar reference letters indicate similar parts throughout the several figures.

As shown in Figures 1 and 2 the invention is applied to a cuff button in which the heads $a$, and the shanks $b$, are similar.

The male member has the usual disc $c$, secured to the shank $b$, and is provided with the usual head $d$, and neck $e$, secured to the disc $c$, all in one integral part.

The female member is provided with an opening $f$, adapted to receive the head $d$, of the male member, and a locking device comprising curved wire bearings $p$, resting against the interior conical wall of the sleeve $h$, secured to the disc $i$. The diameter of the curved wire bearings $p$, is just sufficient as to slide up the interior conical wall of the sleeve $h$, to allow the head $d$, to enter past them. When the bearings return down the interior conical wall of the sleeve $h$, and close around the neck $e$, below the head $d$, the same is securely locked in place and cannot be removed without forcibly raising the bearings to the wider portion of the sleeve $h$.

To provide means for releasing the grip of the bearings upon the head and neck $d$ and $e$, respectively, the shank $b$ of the female portion also comprises an inner tube $j$, centrally located therein and secured by washer $r$ to the head $a$, adapted to contain the bearings $p$, which are guided in recesses $s$, and to allow them a free lateral motion, in and out to follow the interior conical wall of the sleeve $h$, and a shoulder $l$. It also comprises an outer tube $m$, secured to the disc $i$, and containing the sleeve $h$, but free at the upper end, which is jointed by fingers $t$ to a washer $n$, which is slidably adjusted on the inner tube $j$. Around the tube $j$, and between the shoulder $l$, and washer $n$, I provide a coiled spring $o$, adapted to hold the slidable parts all in locking position and yet to yield slidably when pressure is applied as hereinafter stated.

To put the two halves of the cuff button together insert the head $d$, in the opening $f$, and press upon the two outer heads $a$. The inner head $d$, presses upon the bearings $p$, which causes them to yield upwardly and outwardly against the sides of the interior conical wall of the sleeve $h$, until the head $d$, passes the bearings $p$, when the spring $o$, returns all parts to their normal locking position, as will be readily understood.

To unlock the two parts grasp the outer head $a$, shank $b$, and disc $i$, with the thumb and fingers and press upon the head and disc until they part slightly, causing the spring $o$, to rise and separate when the head $d$, is easily removed as will be readily understood.

Having thus described my invention, what I claim as new and desire to secure by said Letters Patent is:

In a snap fastener comprising a female member having a base disc formed with a head receiving opening located centrally therein, a sleeve having inwardly sloping sides positioned about said opening and attached to said base disc, an outer tube provided with spaced inwardly extending fingers, an inner tube spaced from said outer tube and slidable therein formed with a peripheral notch adjacent its upper end and a circumferential shoulder adjacent its lower end, said inner tube having oppositely disposed slots, a washer securely held in said peripheral notch, split ring sections disposed within the slots of said inner tube and the sloping walls of the sleeve, a coil spring positioned about said inner tube and contacting the circumferential shoulder at its lower end, a washer disposed about said inner tube adjacent the inwardly turned fingers on the outer tube and between same and the end of said spring, a male member having a head thereon provided with an annular groove adapted to be engaged by said split ring sections and rigidly held when said male member is in position within the female member.

In testimony whereof, I affix my signature in the presence of two witnesses.

BARNEY COOPER.

Witnesses:
HENRY H. BARBER,
J. J. AMES.